United States Patent
Fakoorian et al.

(10) Patent No.: US 12,309,877 B2
(45) Date of Patent: *May 20, 2025

(54) SIDELINK DISCOVERY PROCEDURE

(71) Applicant: QUALCOMM Incorporated, San Diego, CA (US)

(72) Inventors: Seyed Ali Akbar Fakoorian, San Diego, CA (US); Jing Sun, San Diego, CA (US); Yisheng Xue, San Diego, CA (US); Xiaoxia Zhang, San Diego, CA (US); Yongbin Wei, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/330,872

(22) Filed: Jun. 7, 2023

(65) Prior Publication Data

US 2023/0319540 A1   Oct. 5, 2023

Related U.S. Application Data

(62) Division of application No. 17/078,905, filed on Oct. 23, 2020, now Pat. No. 11,711,683.

(Continued)

(51) Int. Cl.
  *H04W 8/00*   (2009.01)
  *H04L 5/00*   (2006.01)
  (Continued)

(52) U.S. Cl.
  CPC ........... *H04W 8/005* (2013.01); *H04L 5/0055* (2013.01); *H04W 72/02* (2013.01); *H04W 72/1263* (2013.01); *H04W 92/18* (2013.01)

(58) Field of Classification Search
  CPC . H04W 8/005; H04W 72/02; H04W 72/1263; H04W 92/18; H04L 5/0055
  See application file for complete search history.

(56) References Cited

U.S. PATENT DOCUMENTS 10,485,038 B2 * 11/2019 Agiwal ................. H04W 76/14
11,382,107 B2 *  7/2022 Jung ....................... H04W 4/02
(Continued)

FOREIGN PATENT DOCUMENTS

CN      108633074 A      10/2018
CN      108702751 A      10/2018
(Continued)

OTHER PUBLICATIONS

International Search Report and Written Opinion—PCT/US2020/057327—ISA/EPO—Feb. 11, 2021.

*Primary Examiner* — Michael J Moore, Jr.
(74) *Attorney, Agent, or Firm* — Holland & Hart LLP

(57) ABSTRACT

Methods, systems, and devices for wireless communications are described. In a first case, a first user equipment (UE) may transmit to a second UE a sidelink discovery message preamble corresponding to a sidelink discovery message. The first UE may identify resources for transmission of the sidelink discovery messages based on the sidelink discovery message preamble. The first UE may either transmit the sidelink discovery message to the second UE or may receive the sidelink discovery message from the second UE using the identified resources for the transmission of the sidelink discovery message. In some cases, the second UE may transmit sidelink control information (SCI) to the first UE, and may transmit a sidelink discovery message to the first UE based on resources identified in the SCI. In some cases, the first UE may transmit the sidelink discovery message without transmission of a preamble or a SCI.

8 Claims, 13 Drawing Sheets

Related U.S. Application Data

(60) Provisional application No. 62/927,645, filed on Oct. 29, 2019.

(51) Int. Cl.
*H04W 72/02* (2009.01)
*H04W 72/1263* (2023.01)
*H04W 92/18* (2009.01)

(56) References Cited

U.S. PATENT DOCUMENTS

| | | | | |
|---|---|---|---|---|
| 11,711,683 | B2* | 7/2023 | Fakoorian | H04L 5/0094 |
| | | | | 370/329 |
| 2011/0317638 | A1 | 12/2011 | Cho et al. | |
| 2015/0215903 | A1* | 7/2015 | Zhao | H04W 72/04 |
| | | | | 370/329 |
| 2015/0326362 | A1* | 11/2015 | Xiong | H04W 76/10 |
| | | | | 370/336 |
| 2016/0285539 | A1* | 9/2016 | Sadiq | H04W 8/005 |
| 2017/0064534 | A1* | 3/2017 | Loehr | H04L 67/51 |
| 2018/0139599 | A1* | 5/2018 | Yasukawa | H04W 8/005 |
| 2018/0152272 | A1* | 5/2018 | Chae | H04L 5/0032 |
| 2018/0213382 | A1* | 7/2018 | Tabet | H04W 8/005 |
| 2019/0058986 | A1* | 2/2019 | Loehr | H04L 1/1825 |
| 2019/0372647 | A1* | 12/2019 | Su | H04B 7/06954 |
| 2019/0387429 | A1* | 12/2019 | Basu Mallick | H04W 36/03 |
| 2020/0204971 | A1* | 6/2020 | Yasukawa | H04W 4/40 |
| 2020/0351827 | A1* | 11/2020 | Chae | H04W 72/0446 |
| 2020/0383055 | A1* | 12/2020 | Cai | H04W 72/02 |
| 2021/0051673 | A1* | 2/2021 | Chae | H04W 72/23 |
| 2021/0058820 | A1* | 2/2021 | Lee | H04W 28/0268 |
| 2021/0105055 | A1* | 4/2021 | Chae | H04L 5/0026 |
| 2021/0127253 | A1* | 4/2021 | Fakoorian | H04L 5/0053 |
| 2021/0136732 | A1* | 5/2021 | Fakoorian | H04L 5/0044 |
| 2021/0168589 | A1* | 6/2021 | Yasukawa | H04W 72/04 |
| 2021/0258764 | A1* | 8/2021 | Zhang | H04W 72/20 |
| 2021/0354701 | A1* | 11/2021 | Lee | B60W 60/0016 |
| 2021/0400448 | A1* | 12/2021 | Adjakple | H04W 4/40 |
| 2022/0006569 | A1* | 1/2022 | Lee | H04W 72/02 |
| 2023/0319540 | A1* | 10/2023 | Fakoorian | H04L 5/0053 |
| | | | | 370/329 |

FOREIGN PATENT DOCUMENTS

| | | | |
|---|---|---|---|
| WO | WO-2015062475 A1 * | 5/2015 | H04B 7/26 |
| WO | WO2016163972 A1 | 10/2016 | |
| WO | WO2016164582 A1 | 10/2016 | |
| WO | WO-2018170920 A1 | 9/2018 | |

\* cited by examiner

SIDELINK DISCOVERY PROCEDURE

CROSS REFERENCE

The present application for patent is a Divisional of U.S. patent application Ser. No. 17/078,905 by FAKOORIAN et al., entitled "SIDELINK DISCOVERY PROCEDURE" filed Oct. 23, 2020, which claims the benefit of U.S. Provisional Patent Application No. 62/927,645 by FAKOORIAN et al., entitled "SIDELINK DISCOVERY PROCEDURE," filed Oct. 29, 2019, assigned to the assignee hereof, and expressly incorporated by reference in its entirety herein.

FIELD OF TECHNOLOGY

The following relates generally to wireless communications and more specifically to sidelink discovery procedure.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

One or more UEs may communicate directly with a base station using access links, and one or more UEs may communicate with other UEs using sidelink communication channels. A UE initiating sidelink communications may not be aware of nearby UEs, and may also not be aware of available resources for sidelink communications.

SUMMARY

The described techniques relate to improved methods, systems, devices, and apparatuses that support sidelink discovery procedure. Generally, the described techniques provide for discovery procedures for sidelink communications by one or more user equipments (UEs). An initiating UE may transmit a sidelink discovery message preamble to one or more other UEs as a unicast, multicast, or broadcast transmission. The initiating UE may then transmit a sidelink control information (SCI) message that indicates reserved resources for the transmission of a sidelink discovery message. In some examples, the one or more other UEs receiving the sidelink discovery message preamble may respond by transmitting an SCI message. The one or more UEs may then communicate on scheduled resources by transmitting sidelink discovery messages. In some cases, the sidelink discovery message preamble may be omitted, or the SCI may be omitted, or both, and the UEs may communicate using preconfigured resources for transmitting sidelink discovery messages.

A method of wireless communications is described. The method may include transmitting, from a first UE to a second UE, a sidelink discovery message preamble corresponding to a sidelink discovery message, identifying resources for transmission of the sidelink discovery message based on the sidelink discovery message preamble, and transmitting the sidelink discovery message to the second UE or receiving the sidelink discovery message from the second UE using the identified resources for transmission of the sidelink discovery message.

An apparatus for wireless communications is described. The apparatus may include a processor, memory coupled with the processor, and instructions stored in the memory. The instructions may be executable by the processor to cause the apparatus to transmit, from a first UE to a second UE, a sidelink discovery message preamble corresponding to a sidelink discovery message, identify resources for transmission of the sidelink discovery message based on the sidelink discovery message preamble, and transmit the sidelink discovery message to the second UE or receiving the sidelink discovery message from the second UE using the identified resources for transmission of the sidelink discovery message.

Another apparatus for wireless communications is described. The apparatus may include means for transmitting, from a first UE to a second UE, a sidelink discovery message preamble corresponding to a sidelink discovery message, identifying resources for transmission of the sidelink discovery message based on the sidelink discovery message preamble, and transmitting the sidelink discovery message to the second UE or receiving the sidelink discovery message from the second UE using the identified resources for transmission of the sidelink discovery message.

A non-transitory computer-readable medium storing code for wireless communications is described. The code may include instructions executable by a processor to transmit, from a first UE to a second UE, a sidelink discovery message preamble corresponding to a sidelink discovery message, identify resources for transmission of the sidelink discovery message based on the sidelink discovery message preamble, and transmit the sidelink discovery message to the second UE or receiving the sidelink discovery message from the second UE using the identified resources for transmission of the sidelink discovery message.

Some examples of the method, apparatuses, and non-transitory computer-readable medium described herein may further include operations, features, means, or instructions for transmitting, from the first UE to the second UE, a SCI message based on the sidelink discovery message preamble, where the SCI message indicates the resources for transmission of the sidelink discovery message.

Some examples of the method, apparatuses, and non-transitory computer-readable medium described herein may further include operations, features, means, or instructions for receiving, at the first UE and from the second UE, a SCI message based on the sidelink discovery message preamble, where the SCI message indicates the resources for transmission of the sidelink discovery message.

Some examples of the method, apparatuses, and non-transitory computer-readable medium described herein may further include operations, features, means, or instructions for identifying the resources for transmission of the sidelink discovery message based on a configuration.

Some examples of the method, apparatuses, and non-transitory computer-readable medium described herein may further include operations, features, means, or instructions for receiving an indication from a base station that indicates the resources for transmission of the sidelink discovery message.

Some examples of the method, apparatuses, and non-transitory computer-readable medium described herein may further include operations, features, means, or instructions for identifying a fixed timing relationship between the sidelink discovery message preamble and a SCI message, where the SCI message indicates the resources for transmission of the sidelink discovery message.

Some examples of the method, apparatuses, and non-transitory computer-readable medium described herein may further include operations, features, means, or instructions for determining, by the first UE, the resources for transmission of the sidelink discovery message based on a mapping between the sidelink discovery message preamble and the resources for transmission of the sidelink discovery message.

In some examples of the method, apparatuses, and non-transitory computer-readable medium described herein, the mapping includes a hashing rule.

In some examples of the method, apparatuses, and non-transitory computer-readable medium described herein, the sidelink discovery message indicates a source of timing synchronization between the first UE and the second UE, whether the first UE or the second UE may be within a cell coverage, a sidelink synchronization signal identifier corresponding to the first UE, a transmit power control indication, a buffer status report indication, a power headroom report indication, or a combination thereof.

In some examples of the method, apparatuses, and non-transitory computer-readable medium described herein, the sidelink discovery message preamble indicates to the second UE whether the resources for transmission of the sidelink discovery message may be used for transmitting the sidelink discovery message by the first UE or receiving the sidelink discovery message at the first UE.

Some examples of the method, apparatuses, and non-transitory computer-readable medium described herein may further include operations, features, means, or instructions for transmitting the sidelink discovery message to the second UE based on an amount of pending data at the first UE.

Some examples of the method, apparatuses, and non-transitory computer-readable medium described herein may further include operations, features, means, or instructions for receiving an acknowledgement message from the second UE indicating that the second UE detected the sidelink discovery message preamble, decoded a SCI message, or both.

In some examples of the method, apparatuses, and non-transitory computer-readable medium described herein, the acknowledgement message may be received over a sidelink feedback control channel.

Some examples of the method, apparatuses, and non-transitory computer-readable medium described herein may further include operations, features, means, or instructions for receiving the sidelink discovery message from the second UE based on an absence of pending data at the first UE.

In some examples of the method, apparatuses, and non-transitory computer-readable medium described herein, the received sidelink discovery message indicates that the second UE detected the sidelink discovery message preamble, decoded a SCI message, or both.

Some examples of the method, apparatuses, and non-transitory computer-readable medium described herein may further include operations, features, means, or instructions for receiving a SCI message from the second UE.

In some examples of the method, apparatuses, and non-transitory computer-readable medium described herein, the received SCI message indicates that the second UE detected the sidelink discovery message preamble.

In some examples of the method, apparatuses, and non-transitory computer-readable medium described herein, the received SCI message indicates an association with the sidelink discovery message preamble.

In some examples of the method, apparatuses, and non-transitory computer-readable medium described herein, the received SCI message may be scrambled by an identifier indicated in the sidelink discovery message preamble.

In some examples of the method, apparatuses, and non-transitory computer-readable medium described herein, the received SCI message schedules resources for the first UE to transmit the sidelink discovery message to the second UE.

In some examples of the method, apparatuses, and non-transitory computer-readable medium described herein, the received SCI message schedules resources for the second UE to transmit the sidelink discovery message to the first UE.

Some examples of the method, apparatuses, and non-transitory computer-readable medium described herein may further include operations, features, means, or instructions for receiving a sidelink scheduling request over a sidelink feedback channel, where the sidelink scheduling request indicates that the second UE may have pending data to transmit.

In some examples of the method, apparatuses, and non-transitory computer-readable medium described herein, the sidelink feedback channel may be associated with the identified resources for transmission of the sidelink discovery message or may be dynamically indicated by a SCI message.

In some examples of the method, apparatuses, and non-transitory computer-readable medium described herein, the sidelink discovery message preamble may be transmitted using unicast, multicast, broadcast, or a combination thereof.

A method of wireless communications is described. The method may include transmitting, from a first UE to a second UE, a SCI message corresponding to a sidelink discovery message, identifying resources for transmission of the sidelink discovery message based on the SCI message, and transmitting the sidelink discovery message to the second UE or receiving the sidelink discovery message from the second UE using the identified resources for transmission of the sidelink discovery message.

An apparatus for wireless communications is described. The apparatus may include a processor, memory coupled with the processor, and instructions stored in the memory. The instructions may be executable by the processor to cause the apparatus to transmit, from a first UE to a second UE, a SCI message corresponding to a sidelink discovery message, identify resources for transmission of the sidelink discovery message based on the SCI message, and transmit the sidelink discovery message to the second UE or receiving the sidelink discovery message from the second UE using the identified resources for transmission of the sidelink discovery message.

Another apparatus for wireless communications is described. The apparatus may include means for transmitting, from a first UE to a second UE, a SCI message corresponding to a sidelink discovery message, identifying resources for transmission of the sidelink discovery message based on the SCI message, and transmitting the sidelink discovery message to the second UE or receiving the sidelink discovery message from the second UE using the identified resources for transmission of the sidelink discovery message.

A non-transitory computer-readable medium storing code for wireless communications is described. The code may include instructions executable by a processor to transmit, from a first UE to a second UE, a SCI message corresponding to a sidelink discovery message, identify resources for transmission of the sidelink discovery message based on the SCI message, and transmit the sidelink discovery message to the second UE or receiving the sidelink discovery message from the second UE using the identified resources for transmission of the sidelink discovery message.

In some examples of the method, apparatuses, and non-transitory computer-readable medium described herein, the SCI message indicates to the second UE whether the resources for transmission of the sidelink discovery message may be used for transmitting the sidelink discovery message by the first UE or receiving the sidelink discovery message at the first UE.

A method of wireless communications is described. The method may include identifying, at a first UE, a set of resources from a configured set of resources for transmitting a sidelink discovery message to a second UE and transmitting the sidelink discovery message to the second UE using the identified set of resources.

An apparatus for wireless communications is described. The apparatus may include a processor, memory coupled with the processor, and instructions stored in the memory. The instructions may be executable by the processor to cause the apparatus to identify, at a first UE, a set of resources from a configured set of resources for transmitting a sidelink discovery message to a second UE and transmit the sidelink discovery message to the second UE using the identified set of resources.

Another apparatus for wireless communications is described. The apparatus may include means for identifying, at a first UE, a set of resources from a configured set of resources for transmitting a sidelink discovery message to a second UE and transmitting the sidelink discovery message to the second UE using the identified set of resources.

A non-transitory computer-readable medium storing code for wireless communications is described. The code may include instructions executable by a processor to identify, at a first UE, a set of resources from a configured set of resources for transmitting a sidelink discovery message to a second UE and transmit the sidelink discovery message to the second UE using the identified set of resources.

DETAILED DESCRIPTION

Figure 1:
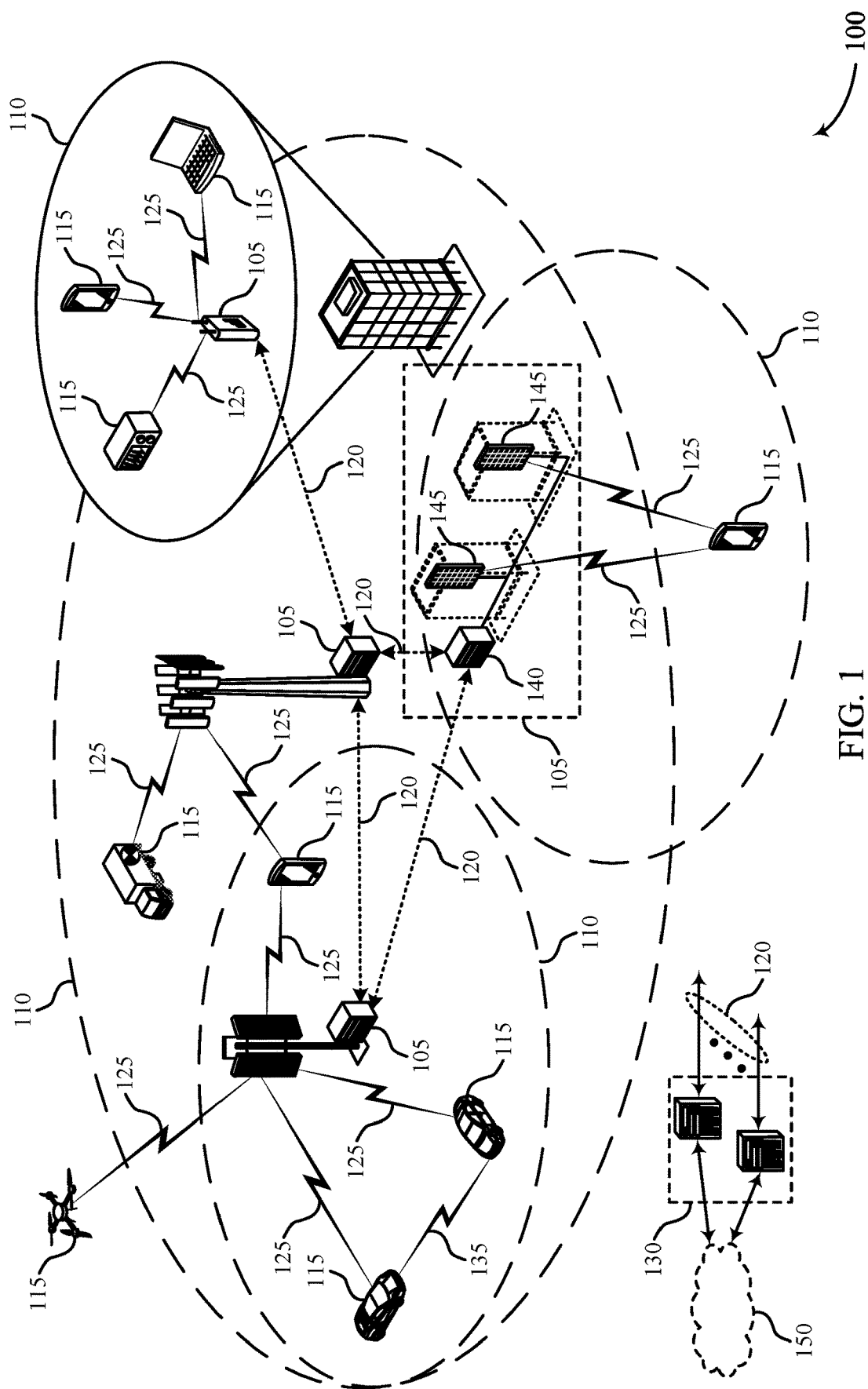
FIG. 1 illustrates an example of a wireless communications system that supports sidelink discovery procedure in accordance with aspects of the present disclosure.

A wireless communications system may support both access links and sidelinks for communications between wireless devices. An access link may refer to a communication link between a user equipment (UE) and a base station. A UE may also be an example of an integrated access backhaul (IAB) node. An access link may support uplink signaling, downlink signaling, connection procedures, etc. One or more UEs connected to a base station over access links may derive timing from the base station. A sidelink may refer to any communication link between similar wireless devices (e.g., a communication link between UEs, a backhaul communication link between base stations, etc.). It is noted that while various examples provided herein are discussed for UE sidelink devices, such sidelink techniques may be used for any type of wireless devices that use sidelink communications. For example, a sidelink may support device-to-device (D2D) communications, vehicle-to-everything (V2X) and/or vehicle-to-vehicle (V2V) communications, message relaying, discovery signaling, beacon signaling, or any combination of these or other signals transmitted over-the-air from one wireless device to one or more other wireless devices.

As demand for sidelink communication increases, (e.g., due to increased V2X demand for autonomous and semi-autonomous vehicles, D2D communication between Internet-of-Things (IoT) devices, factory automation etc.), techniques to efficiently and reliably enhance throughput and reliability of sidelink channels is desirable. In some cases, sidelink groupcast communications may be desired, in which one transmitting device may transmit signals to multiple other devices (e.g., a vehicle that transmits sensor data to multiple other vehicles via sidelink communications). Further, coordination of resources used for sidelink and techniques to decrease the number of sidelink retransmissions and improve efficiency at transmitting and receiving UEs may be desired.

Sidelink discovery and sidelink wireless communications may be used for public safety applications. For example, sidelink discovery may be a method of service discovery, and the discovery information may include timing synchronization information, source of timing synchronization information (e.g., GPS, eNB, gNB), and information on whether the discovered device is in coverage or out of coverage where some devices (e.g., UEs). In some examples, a UE may repeatedly broadcast discovery messages (e.g., 232-bit messages) over a physical shared discovery channel, with a configured resource pool for physical shared discovery channel transmissions and receptions. The discovery procedure may be a broadcast procedure in which a UE configured for D2D communications may transmit and receive information from nearby UEs. However, in some examples, using a broadcast procedure and/or using preconfigured resources for transmission of the discovery messages may limit the flexibility of the scheduling of discovery messages.

In some wireless communications systems (e.g., 5G or NR systems), unicast communications, multicast communications, and broadcast communications may be supported in sidelink communications by one or more UEs. Sidelink communication by one or more UEs may include transmissions in physical sidelink control channel (PSCCH), physical sidelink shared channel (PSSCH), and the physical sidelink feedback channel (PSFCH). Sidelink communications may be applied to other applications including vertical domains, such as Industrial Internet-of-Things (IIoT), using techniques from V2X sidelink communications. Thus, IIoT users may not need to introduce new channel types and new configurations, as IIoT users and applications may utilize PSCCH, PSSCH, and PSFCH as described herein. Further, physical sidelink discovery channel (PSDCH) may be used for sidelink communications and discovery for IIoT applications.

One or more UEs communicating over sidelink channels may utilize a number of techniques to initiate device discovery and communications. In a first technique, a UE may initiate device discovery by transmitting a discovery preamble. In this technique, a first initiating UE may transmit a discovery preamble in order to discover and detect nearby UEs, whether the UEs are served over access links by the same base station as the transmitting UE or are out of coverage of the base station. The initiating UE may transmit the discovery preamble before communications over the PSCCH (e.g., transmission of sidelink control information (SCI)) or PSSCH (e.g., sidelink discovery messages) occur. Transmitting a sidelink discovery message preamble may reduce the probability of collision and may enable the transmitting UE and the receiving UE to flexibly reserve resources and signal the reservation of resources for the transmission of sidelink discovery messages. This may enable the initiating UEs and discovered UEs to perform timing adjustment before sidelink communications occur. This timing adjustment may be valuable in cases where the UE transmitting the discovery preamble in the PSDCH is out of coverage and targets discovering in-coverage UEs, or the UE transmitting the PSDCH is in coverage and is targeting one or more out of coverage UEs.

In a second technique, the initiating UE may perform discovery by transmitting SCI without first transmitting a sidelink discovery preamble. In this case, the initiating UE may transmit the SCI, which may schedule resources for data transmissions over a PSSCH. Either the initiating UE or the receiving UE may transmit data over the scheduled PSSCH.

In a third technique, the initiating UE may transmit the PSDCH on preconfigured PSSCH resources. Thus, the initiating UE may determine not to transmit a discovery preamble. The initiating UE and one or more receiving UEs may also determine not to transmit a SCI, as the SCI would be used to schedule PSSCH. In this technique, the PSSCH resources are preconfigured, so the discovery preamble and the SCI transmission are unnecessary. The PSSCH may be preconfigured in control signaling in device set-up or in initial connection communication with a base station. For example, the preconfigured PSSCH resources may be indicated to one or more UEs in radio resource control (RRC) or other signaling.

Aspects of the disclosure are initially described in the context of wireless communications systems. Aspects of the disclosure are then described with respect to process flows. Aspects of the disclosure are further illustrated by and described with reference to apparatus diagrams, system diagrams, and flowcharts that relate to sidelink discovery procedure.

FIG. 1 illustrates an example of a wireless communications system 100 that supports sidelink discovery procedure in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($0f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Wireless communications system 100 may support sidelink discovery procedures and PSDCH transmissions in NR deployments, for example. In some examples, a first UE 115 may transmit to a second UE 115 a sidelink discovery message preamble corresponding to a sidelink discovery message. The first UE 115 may identify resources for transmission of the sidelink discovery messages based on the sidelink discovery message preamble. The first UE 115 may either transmit the sidelink discovery message to the second UE 115 or may receive the sidelink discovery message from the second UE 115 using the identified resources for the transmission of the sidelink discovery message. In some cases, the second UE 115 may transmit a SCI to the first UE 115, and may transmit a sidelink discovery message to the first UE 115 based on resources identified in the SCI. In some cases, the first UE 115 may transmit the sidelink discovery message without transmission of a sidelink discovery preamble or a SCI.

Figure 2:
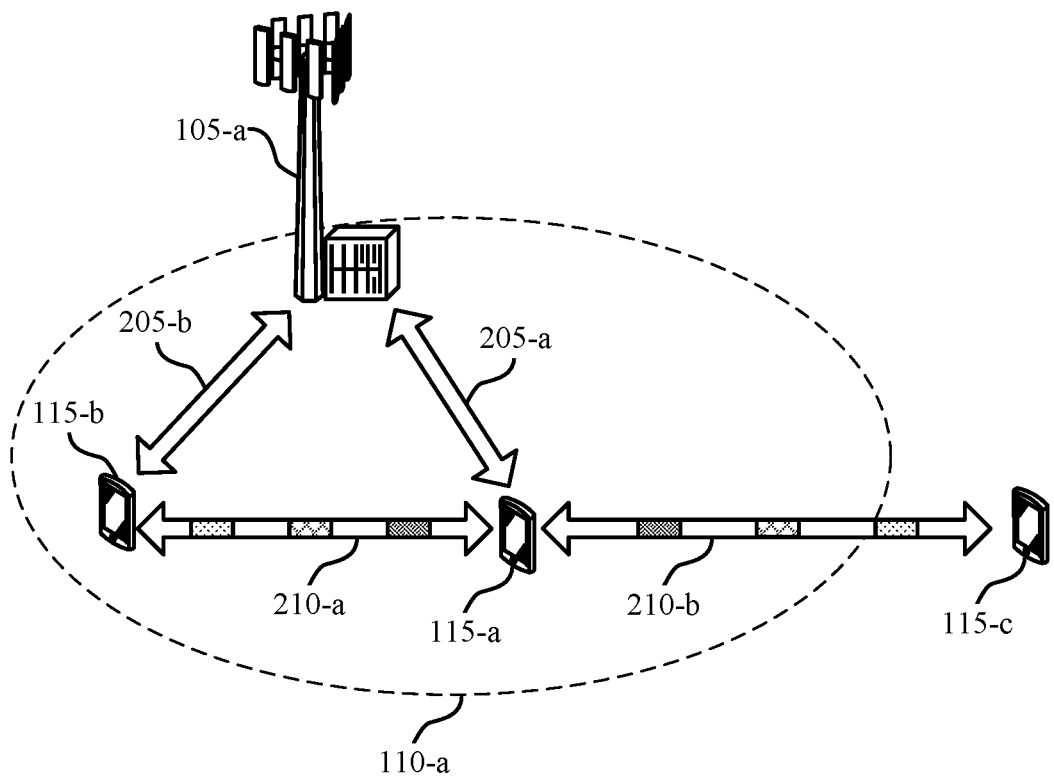
FIG. 2 illustrates an example of a wireless communications system that supports sidelink discovery procedure in accordance with aspects of the present disclosure.

FIG. 2 illustrates an example of a wireless communications system 200 that supports sidelink discovery procedure in accordance with aspects of the present disclosure. In some examples, wireless communications system 200 may implement aspects of wireless communication system 100. The first UE 115-a, second UE 115-b, and third UE 115-c may communicate with each other to provide data or other information via sidelinks 210. For example, the first UE 115-a may communicate with the second UE 115-b via sidelink 210-a, and the first UE 115-a may communicate with the third UE 115-c via sidelink 210-b. It is noted that the illustrated sidelink groupcast communications group provide communications between three UEs 115, which are illustrated in wireless communications system 200 for the sake of brevity, and the techniques described herein may be applicable to other numbers of UEs 115 within a system that communicate with sidelink communications. Further, sidelink communication techniques may be used for device-to-device communication of wireless devices other than UEs, such as base station communications (e.g., wireless backhaul links between base stations or transmit-receive points (TRPs), etc.), communications between access points, and the like.

In order to transmit sidelink communications, either via unicast, multicast, or broadcast communications, an initiating UE 115 (e.g., UE 115-a) may discover other nearby UEs 115 (e.g., UE 115-b and 115-c) in order to transmit sidelink communications. The discovery process may align timing between UEs 115 for sidelink transmissions, and may also align communications resources between UEs 115 to decrease collisions and increase communication efficiency.

UE 115-a may be an initiating UE 115, which may transmit information relating to discovery of other UEs 115, before transmitting sidelink messages and other information to discovered UEs 115.

In a first technique, UE 115-a may transmit a sidelink discovery preamble 215 to one or more other UEs 115 (e.g., UE 115-b and UE 115-c). In these cases, UE 115-a may transmit sidelink discovery preamble 215 before any communication occurs over the PSCCH (e.g., transmission of a SCI) or PSSCH (e.g., transmission of sidelink discovery messages) by any UE 115. UE 115-a may transmit the sidelink discovery preamble 215 in a PSDCH. The sidelink discovery preamble 215 may include information relating to timing adjustments in order to synchronize timing between UEs 115-a, 115-b, and 115-c. For example, UE 115-c may be outside of coverage area 110-a, and therefore may not receive information, such as timing information, from base station 105-a over an access link 205.

In some cases, the sidelink discovery preamble 215 waveform may be in the form of a sidelink synchronization signal block (S-SSB), such as a sidelink primary synchronization signal (S-PSS), a sidelink secondary synchronization signal (S-SSS), or a physical sidelink broadcast channel (PSBCH). In some cases, the sidelink discovery preamble 215 may be a preamble similar to a random access channel (RACH) preamble configuration. For example, the sidelink discovery preamble 215 may include one or more cyclic shifts, and one or more roots which may distinguish different sidelink discovery preambles 215, which may aid in avoiding data collisions.

In some cases, UE 115-a may transmit sidelink discovery preamble 215 over preconfigured resources. The preconfigured resources may be indicated to UE 115-a by base station 105-a during configuration or connection set-up over access link 205-a. In other cases, base station 105-a (e.g., a Mode-1 gNB) may dynamically indicate which UE 115 is to transmit the sidelink discovery preamble 215, or which resources a UE 115 may use to transmit the sidelink discovery preamble 215.

In some cases, there may also be a fixed timing relationship between when sidelink discovery preamble 215 is transmitted and when the SCI 220 is transmitted over the PSCCH. The SCI 220 may be transmitted by the initiating UE 115-a or a receiving UE 115 (e.g., UE 115-b). The transmission of the SCI 220 may determine and schedule the transmission timing of the PSSCH, along with transmission resources. The timing relationship between transmission of sidelink discovery preamble 215 and transmission of the SCI 220 in the PSCCH may be configured based on whether UE 115-*a* or UE 115-*b* transmits the SCI 220 in the PSCCH.

In some cases, the sidelink discovery preamble 215 itself may determine the transmission timing of the PSSCH. For example, the transmission timing may be based on a hashing rule. In this example, there may be no need for either UE 115-*a* or UE 115-*b* to transmit SCI 220 in the PSCCH.

In some cases, the sidelink discovery preamble 215 or the PSSCH may contain information such as a sidelink service set identifier (SL-SSID) corresponding to initiating UE 115-*a* or UE 115-*b*, depending on which UE 115 transmits the PSSCH. The sidelink discovery preamble or the PSSCH may also contain information such as an indication of whether the initiating UE 115-*a* is in coverage or out of coverage, the source of the timing synchronization (e.g., base station 105-*a*, GNSS, another base station 105), transmit power control (TPC) information, buffer status report (BSR) information, power headroom report (PHR) information, and other information.

In some cases, UE 115-*a* may transmit sidelink discovery preamble 215 along with PSDCH in order to obtain timing recovery or timing synchronization between UEs 115 that are in coverage and out of coverage.

Further, collision detection may be improved by transmitting sidelink discovery preamble 215. For example, with a RACH based sidelink discovery preamble 215, sidelink discovery preamble 215 may include multiple roots and cyclic shifts, which may improve collision detection at receiving UE 115-*b*. Additionally or alternatively, the transmission of the SCI 220 may be used for collision detection, as, in some cases, the PSCCH may occupy fewer resources than the sidelink discovery preamble 215.

In this first technique, in some cases the UE 115 (e.g., UE 115-*b* or UE 115-*c*) that receives sidelink discovery preamble 215 may transmit SCI 220 to initiating UE 115-*a*. UE 115-*b* may acknowledge reception of the sidelink discovery preamble 215 by transmitting a SCI 220 to UE 115-*a*. In some cases, the SCI 220 transmitted by UE 115-*b* may also schedule PSSCH resources for transmissions by UE 115-*a*. UE 115-*a* may transmit discovery information or pending data to UE 115-*b* in the scheduled PSSCH. In cases where sidelink discovery preamble 215 includes a SL-SSID of initiating UE 115-*a*, the SCI 220 transmitted by UE 115-*b* may reflect the SL-SSID of UE 115-*a*. For example, the CRC of the SCI 220 transmitted by UE 115-*b* may be scrambled by the SL-SSID of UE 115-*a*.

Additionally or alternatively, UE 115-*b* may acknowledge reception of sidelink discovery preamble 215 from UE 115-*a* by transmitting a SCI 220 that schedules PSSCH for data transmission by UE 115-*b*. For example, UE 115-*a* may not have pending data (as indicated by a BSR, which may be included in the sidelink discovery preamble 215), but UE 115-*b* may have pending data, so UE 115-*b* may schedule a PSSCH to transmit the pending data of UE 115-*b*.

In another case, the PSFCH, which may be associated with the PSSCH or may be dynamically indicated by the transmitted SCI 220, may carry HARQ-ACK information or SL SR information.

In a second technique, initiating UE 115-*a* may transmit SCI 220 to one or more UEs 115 without transmission of a sidelink discovery preamble 215. UE 115-*a* may transmit SCI 220 to one or more UEs 115, and the SCI 220 may schedule resources for data transmission in the PSSCH by a receiving UE 115 (e.g., UE 115-*b* or UE 115-*c*) or by initiating UE 115-*a*. The PSCCH may occupy fewer resources than the PSSCH, and thus in this technique the demodulation reference signal (DMRS) of the PSCCH may be used for collision handling.

In either case of UE 115-*a* transmitting sidelink discovery preamble 215, or in the case of UE 115-*a* transmitting SCI 220 without sidelink discovery preamble 215, either UE 115-*a* or a receiving UE 115 (e.g., UE 115-*b* or UE 115-*c*) may transmit sidelink discovery messages 225 in the PSSCH in response. Whether initiating UE 115-*a* or a receiving UE 115 transmits PSSCH may depend on multiple different parameters. For example, initiating UE 115-*a* may have pending data (e.g., in a data buffer), and UE 115-*a* may transmit PSSCH. In this example, UE 115-*b* may transmit PSFCH which may acknowledge that the discovery procedure has occurred and reached UE 115-*b*. In other cases, UE 115-*a* may not have pending data, but a receiving UE 115-*b* may have pending data, a UE 115-*b* may transmit PSSCH. UE 115-*b* may use PSSCH to transmit data, data corresponding to a sidelink BSR, a SL-SSID, or other information. In this case, the transmission of sidelink discovery message 225 in PSSCH by UE 115-*b* may also acknowledge the discovery procedure by UE 115-*a*.

In a third technique, initiating UE 115-*a* may transmit sidelink discovery message 225 to one or more other UEs 115 over sidelinks 210 on preconfigured resources, without prior transmission of a sidelink discovery preamble 215 or a SCI 220 220. In this case, collision detection may occur based on the DMRS of the sidelink discovery message 225 transmitted in the preconfigured PSSCH resources. There may be more DMRS symbols with different cyclic shifts or same cyclic shifts in order to achieve with collision resolution.

Figure 3:
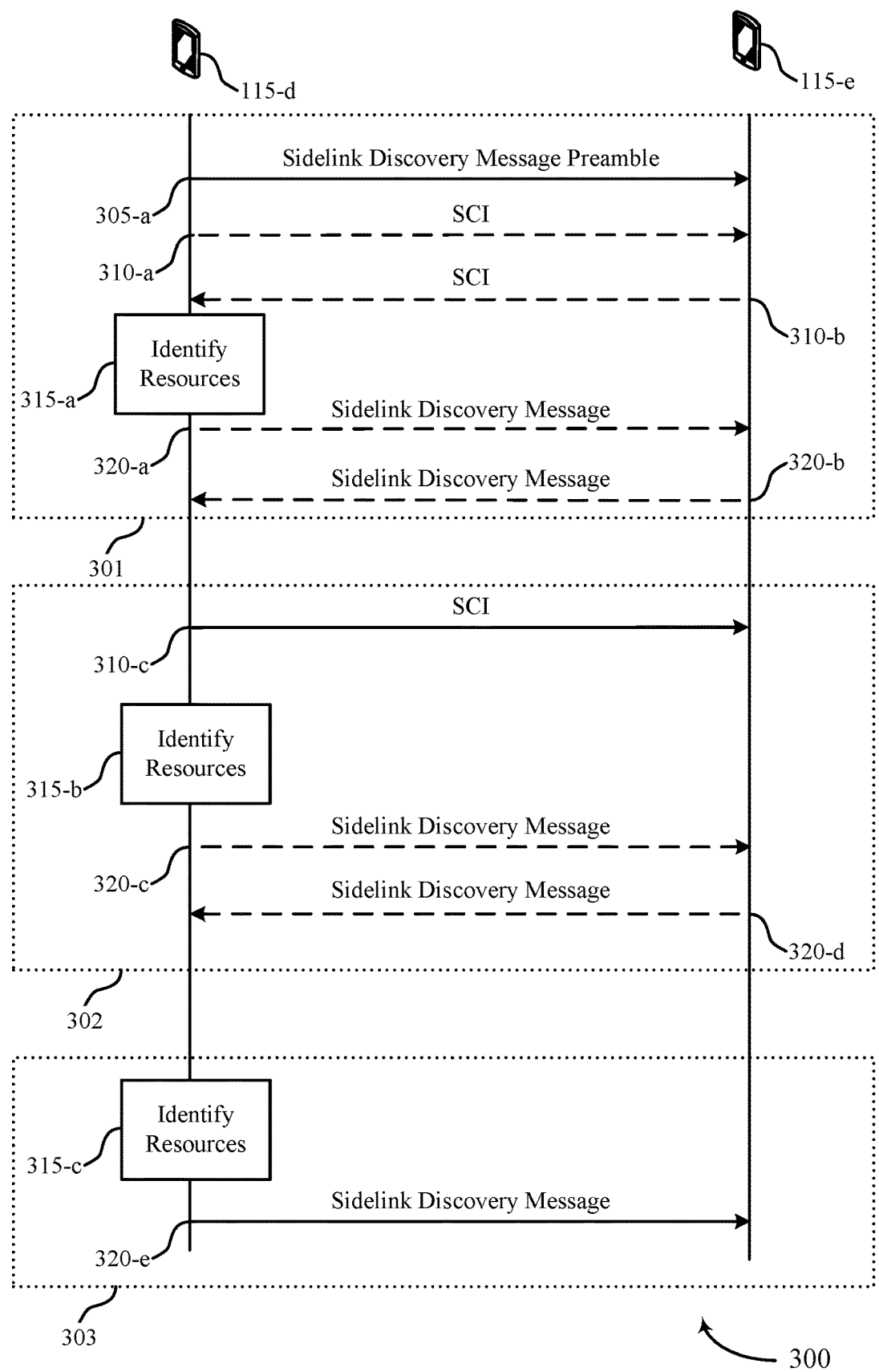
FIG. 3 illustrates an example of a process flow that supports sidelink discovery procedure in accordance with aspects of the present disclosure.

FIG. 3 illustrates an example of a process flow 300 that supports sidelink discovery procedure in accordance with aspects of the present disclosure. In some examples, process flow 300 may implement aspects of wireless communication systems 100 and 200. Process flow 300 includes UE 115-*d* and UE 115-*e*, which may be examples of UEs 115 as described with reference to FIGS. 1 and 2. UEs 115 may perform sidelink discovery procedures and may communicate with one or more UEs 115 over sidelink communication links. Process flow 300 may illustrate examples of the sidelink discovery techniques described with reference to FIG. 2. Process 301 may be an example of the first technique described. Process 302 may be an example of the second technique described. Process 303 may be an example of the third technique described.

For example, process 301 may illustrate a case where UE 115-*d* transmits a sidelink discovery preamble to initiate the sidelink discovery process. At 305-*a*, UE 115-*d* may transmit, to UE 115-*e*, a sidelink discovery preamble corresponding to a sidelink discovery message. The sidelink discovery preamble message may be transmitted using unicast, multicast, broadcast, or a combination of these.

At 310-*a*, in some cases UE 115-*d* may transmit, to UE 115-*e*, a SCI message based on the sidelink discovery message preamble. In other cases, at 310-*b*, UE 115-*e* may transmit a SCI message based on the sidelink discovery message preamble. UE 115-*d* may receive the SCI at 310-*b* from UE 115-*e*. In either case, the SCI message may indicate the resources for transmission of the sidelink discovery message. In cases where UE 115-*d* receives the SCI at 310-*b*, the SCI message may indicate that UE 115-*e* detected the sidelink discovery message preamble at 305-*a*. The received SCI message at 310-*b* may also indicate an association with the sidelink discovery message preamble. The SCI message at 310-*b* may be scrambled by an identifier indicated in the sidelink discovery message preamble. The SCI message at 310-b may schedule resources for UE 115-d to transmit the sidelink discovery message to UE 115-e at 320-a. The SCI message at 310-b may also schedule resources for UE 115-e to transmit the sidelink discovery message to UE 115-d at 320-b.

UE 115-d may receive an acknowledgment message from UE 115-e indicating that UE 115-e detected the sidelink discovery message preamble at 305-a, decoded a SCI message (e.g., SCI message transmitted at 310-a) or both. The acknowledgment message may be received by UE 115-d over a PSFCH.

In some cases, UE 115-d may receive a sidelink scheduling request over a sidelink feedback channel, where the sidelink scheduling request indicates that UE 115-e has pending data to transmit. The sidelink feedback channel may be associated with the identified resources for transmission of the sidelink discovery message or may be dynamically indicated by a SCI message.

At 315-a, UE 115-d may identify resources for transmission of the sidelink discovery message based on the sidelink discovery message preamble. In some cases, UE 115-d may identify the resources for transmission of the sidelink discovery message based on a configuration. In other cases, UE 115-d may receive an indication from a base station 105 that indicates the resources for transmission of the sidelink discovery message. UE 115-d may identify a fixed timing relationship between the sidelink discovery message preamble and a SCI message. The SCI message may indicate the resources for transmission of the sidelink discovery message.

UE 115-d may determine the resources for transmission of the sidelink discovery message based on a mapping between the sidelink discovery message preamble and the resources for the transmission of the sidelink discovery message. The mapping may involve a hashing rule.

At 320-a, UE 115-d may transmit the sidelink discovery message to UE 115-e, or at 320-b UE 115-d may receive the sidelink discovery message from UE 115-e using the identified resources for transmission of the sidelink discovery message.

The sidelink discovery message preamble may indicate to UE 115-e whether the resources for transmission of the sidelink discovery message are used for transmitting the sidelink discovery message by UE 115-d at 320-a or receiving the sidelink discovery message by UE 115-e at 320-b. In some cases, UE 115-d may transmit the sidelink discovery message at 320-a based on an amount of pending data at UE 115-d. In some cases, UE 115-d may receive sidelink discovery message 320-b from UE 115-e based on an absence of pending data at UE 115-d. The received sidelink discovery message at 320-b may indicate that UE 115-e detected the sidelink discovery message preamble at 305-a.

Process 302 may show an example of a sidelink discovery procedure without use of a sidelink discovery message preamble. In this case, at 310-c, UE 115-d may transmit, to UE 115-e, a SCI message corresponding to a sidelink discovery message.

At 315-b, UE 115-d may identify resources for transmission of the sidelink discovery message based on the SCI message. The SCI message may indicate to UE 115-e whether the resources for transmission of the sidelink discovery message are used for transmitting the sidelink discovery message by UE 115-d or receiving the sidelink discovery message at UE 115-d. In some cases, UE 115-e may transmit an acknowledgement message indicating that UE 115-e decoded the SCI message.

At 320-c, UE 115-d may transmit the sidelink discovery message to UE 115-e, or at 320-d UE 115-d may receive the sidelink discovery message from UE 115-e using the identified resources for transmission of the sidelink discovery message. In cases where UE 115-d receives the sidelink discovery message at 320-d from UE 115-e, the receives sidelink discovery message may indicate that UE 115-e decoded the SCI message transmitted at 320-c.

Process 303 may show an example of sidelink discovery procedure without use of a sidelink discovery message preamble, and without transmission of an SCI. In these cases, at 315-c, UE 115-d may identify a set of resources from a configures set of resources for transmitting a sidelink discovery message to UE 115-e.

At 320-e, UE 115-d may transmit the sidelink discovery message to UE 115-e using the identified set of resources.

In any of processes 301, 302, or 303, the sidelink discovery message 320 may indicate a source of timing synchronization between UE 115-d and UE 115-e, whether UE 115-d or UE 115-e is within a cell coverage, a SL-SSID corresponding to UE 115-e, a TPC indication, a BSR indication, a PHR indication, or a combination of these.

Figure 4:
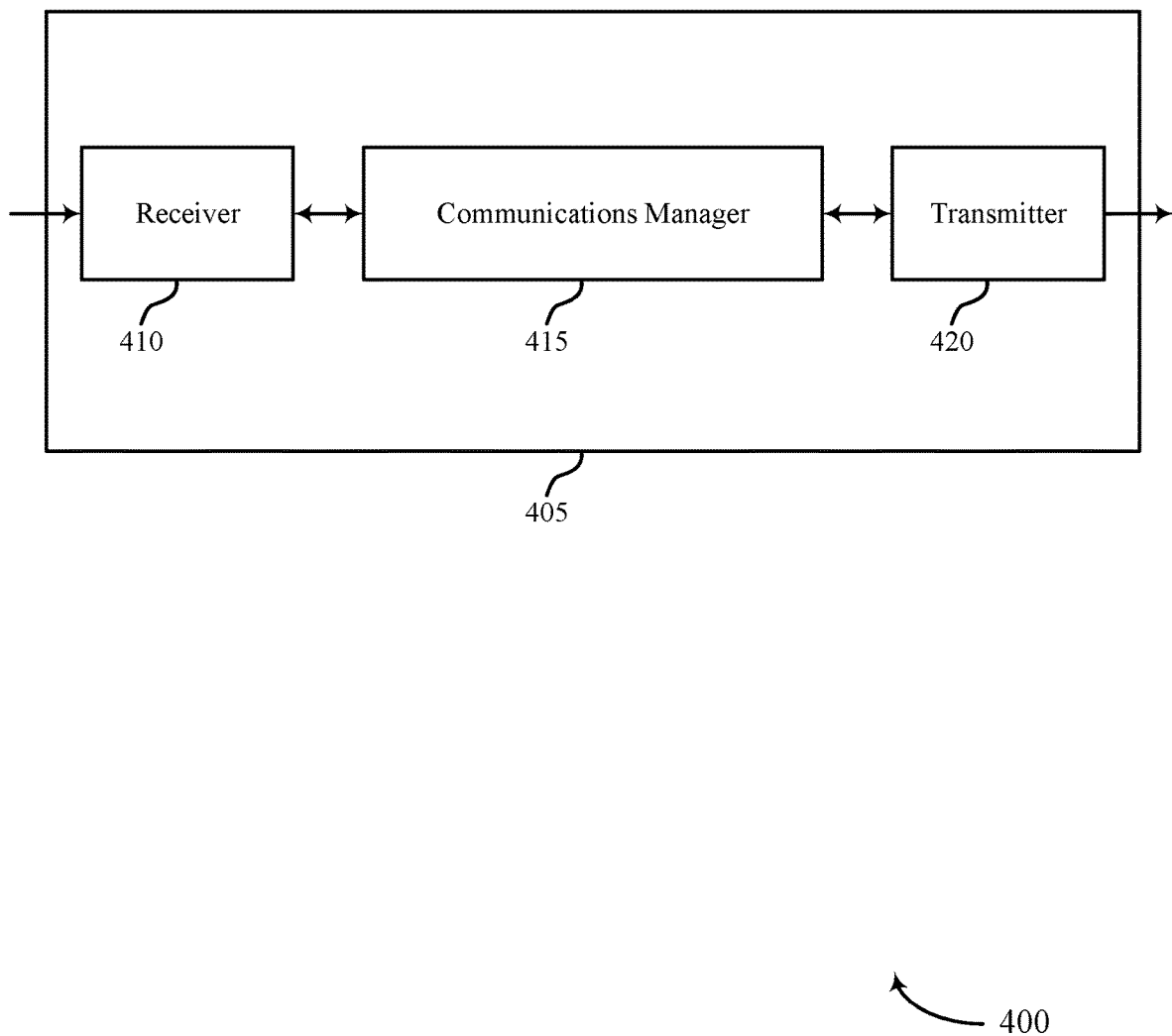
FIGS. 4 and 5 show block diagrams of devices that support sidelink discovery procedure in accordance with aspects of the present disclosure.

FIG. 4 shows a block diagram 400 of a device 405 that supports sidelink discovery procedure in accordance with aspects of the present disclosure. The device 405 may be an example of aspects of a UE 115 as described herein. The device 405 may include a receiver 410, a communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to sidelink discovery procedure, etc.). Information may be passed on to other components of the device 405. The receiver 410 may be an example of aspects of the transceiver 720 described with reference to FIG. 7. The receiver 410 may utilize a single antenna or a set of antennas.

The communications manager 415 may transmit, from a first UE to a second UE, a sidelink discovery message preamble corresponding to a sidelink discovery message, identify resources for transmission of the sidelink discovery message based on the sidelink discovery message preamble, and transmit the sidelink discovery message to the second UE or receiving the sidelink discovery message from the second UE using the identified resources for transmission of the sidelink discovery message. The communications manager 415 may also transmit, from a first UE to a second UE, a SCI message corresponding to a sidelink discovery message, identify resources for transmission of the sidelink discovery message based on the SCI message, and transmit the sidelink discovery message to the second UE or receiving the sidelink discovery message from the second UE using the identified resources for transmission of the sidelink discovery message. The communications manager 415 may also identify, at a first UE, a set of resources from a configured set of resources for transmitting a sidelink discovery message to a second UE and transmit the sidelink discovery message to the second UE using the identified set of resources. The communications manager 415 may be an example of aspects of the communications manager 710 described herein.

The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

In some examples, the communications manager 415 described herein may be implemented as a chipset of a wireless modem, and the receiver 410 and the transmitter 420 may be implemented as sets of analog components (e.g., amplifiers, filters, phase shifters, antennas, etc.) The wireless modem may obtain and decode signals from the receiver 410 over a receive interface, and may output signals for transmission to the transmitter 420 over a transmit interface.

The actions performed by the communications manager 415 as described herein may be implemented to realize one or more potential advantages. One implementation may allow a UE 115 to save power and increase battery life by improving the efficiency of sidelink communications. The sidelink communications discovery procession by communications manager 415 may act to align timing and resources between UEs 115 communicating over sidelinks, which may decrease the number of retransmissions, further improving efficiency and thereby increasing battery life.

Figure 5:
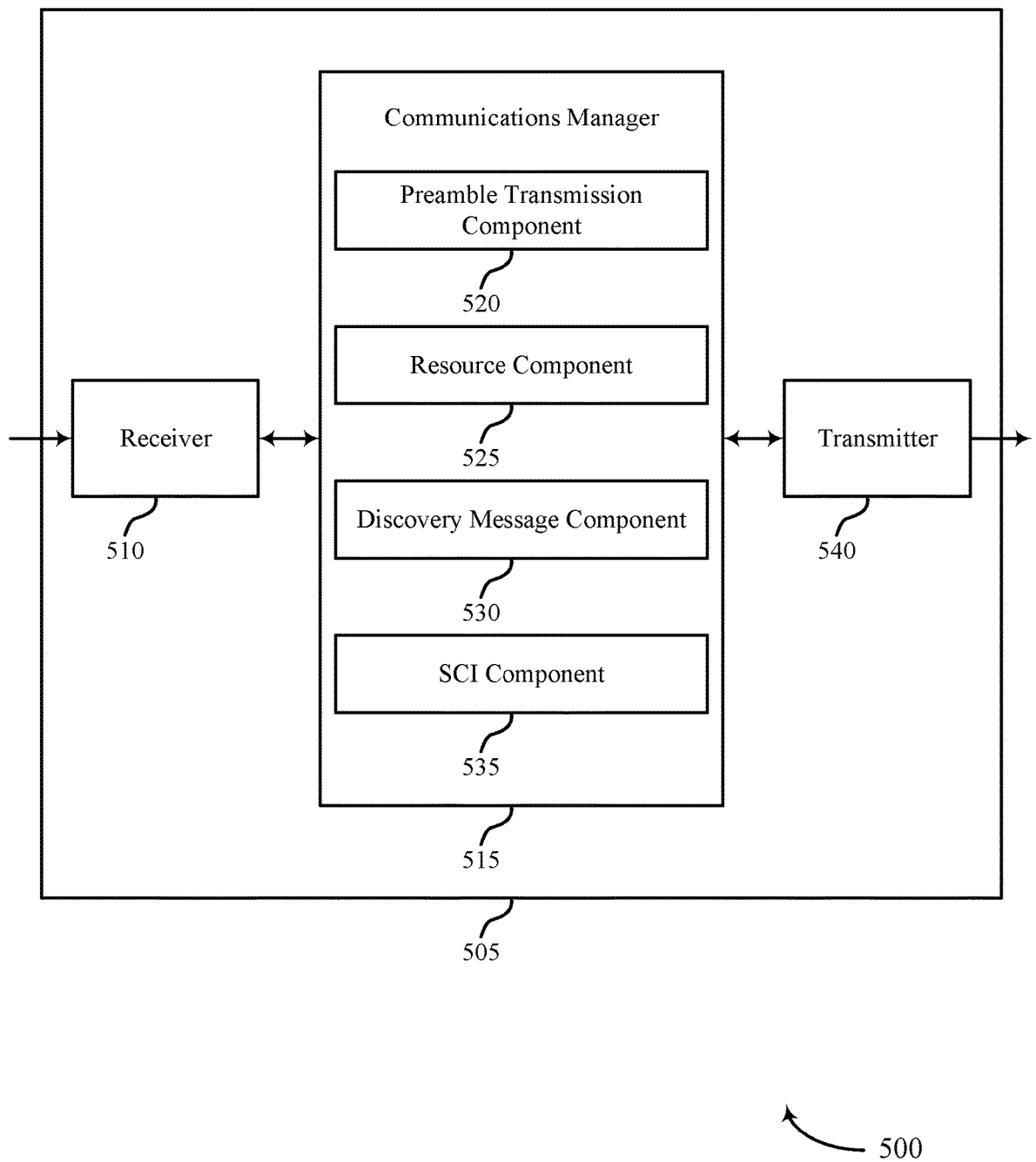

FIG. 5 shows a block diagram 500 of a device 505 that supports sidelink discovery procedure in accordance with aspects of the present disclosure. The device 505 may be an example of aspects of a device 405, or a UE 115 as described herein. The device 505 may include a receiver 510, a communications manager 515, and a transmitter 540. The device 505 may also include a processor. Each of these components may be in communication with one another (e.g., via one or more buses).

The receiver 510 may receive information such as packets, user data, or control information associated with various information channels (e.g., control channels, data channels, and information related to sidelink discovery procedure, etc.). Information may be passed on to other components of the device 505. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include a preamble transmission component 520, a resource component 525, a discovery message component 530, and a SCI component 535. The communications manager 515 may be an example of aspects of the communications manager 710 described herein.

The preamble transmission component 520 may transmit, from a first UE to a second UE, a sidelink discovery message preamble corresponding to a sidelink discovery message. The resource component 525 may identify resources for transmission of the sidelink discovery message based on the sidelink discovery message preamble. The discovery message component 530 may transmit the sidelink discovery message to the second UE or receiving the sidelink discovery message from the second UE using the identified resources for transmission of the sidelink discovery message.

The SCI component 535 may transmit, from a first UE to a second UE, a SCI message corresponding to a sidelink discovery message. The resource component 525 may identify resources for transmission of the sidelink discovery message based on the SCI message. The discovery message component 530 may transmit the sidelink discovery message to the second UE or receiving the sidelink discovery message from the second UE using the identified resources for transmission of the sidelink discovery message.

The resource component 525 may identify, at a first UE, a set of resources from a configured set of resources for transmitting a sidelink discovery message to a second UE. The discovery message component 530 may transmit the sidelink discovery message to the second UE using the identified set of resources.

The transmitter 540 may transmit signals generated by other components of the device 505. In some examples, the transmitter 540 may be collocated with a receiver 510 in a transceiver module. For example, the transmitter 540 may be an example of aspects of the transceiver 720 described with reference to FIG. 7. The transmitter 540 may utilize a single antenna or a set of antennas.

A processor of a UE 115 (e.g., controlling the receiver 510, the transmitter 520, or the transceiver 720 as described with reference to FIG. 7) may operate the components described herein to improve the efficiency of a sidelink discovery process. The processor of the UE 115 may efficiently operate transmitters 510 and receivers 520 to transmit discovery sidelink preamble and receive SCI to efficiently detect sidelink UEs 115 and schedule resources for sidelink data transmissions. The processor of the UE 115 may therefore improve efficiency and battery life of a UE 115 by decreasing number of retransmissions and decreasing latency.

Figure 6:
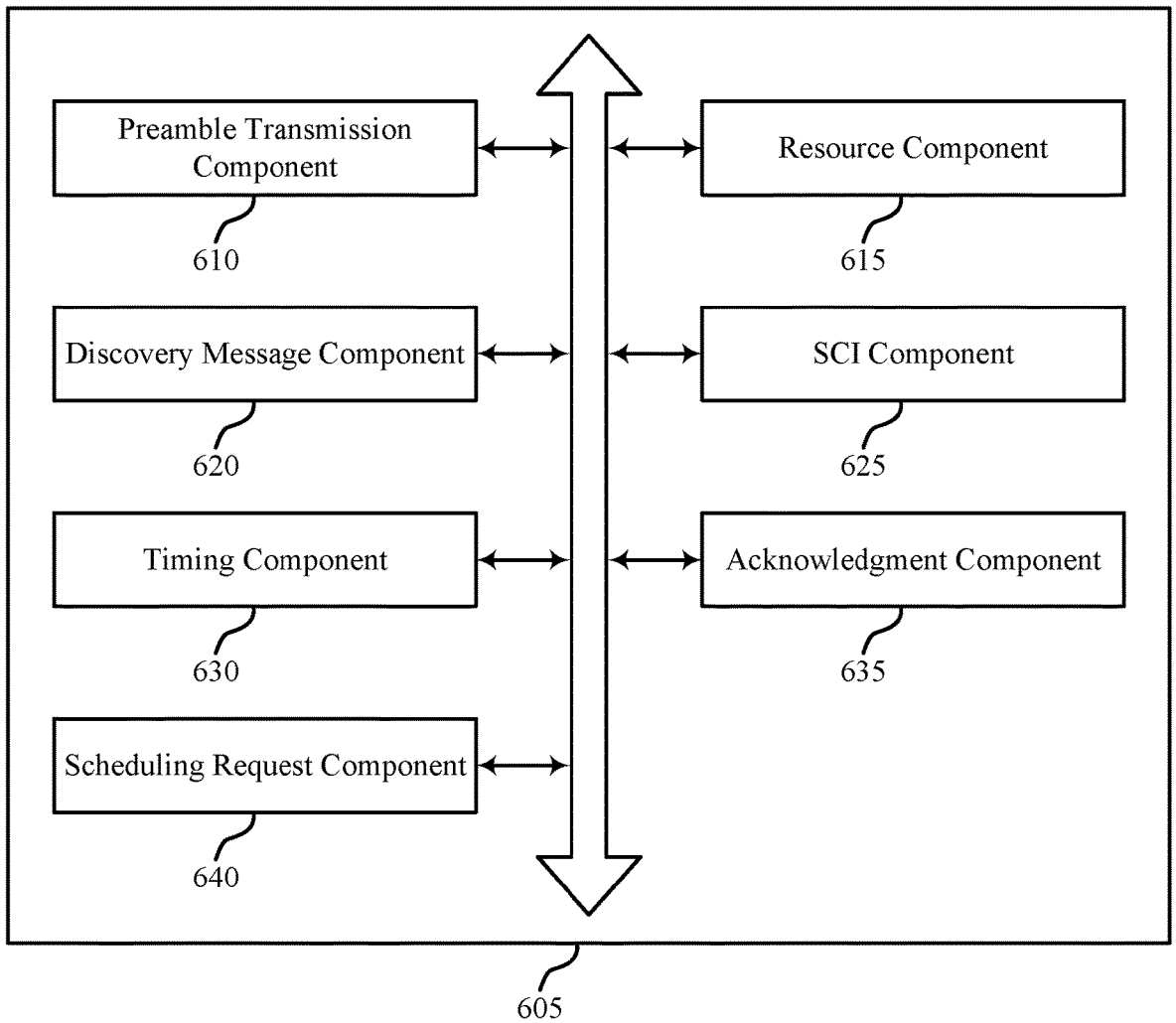
FIG. 6 shows a block diagram of a communications manager that supports sidelink discovery procedure in accordance with aspects of the present disclosure.

FIG. 6 shows a block diagram 600 of a communications manager 605 that supports sidelink discovery procedure in accordance with aspects of the present disclosure. The communications manager 605 may be an example of aspects of a communications manager 415, a communications manager 515, or a communications manager 710 described herein. The communications manager 605 may include a preamble transmission component 610, a resource component 615, a discovery message component 620, a SCI component 625, a timing component 630, an acknowledgment component 635, and a scheduling request component 640. Each of these modules may communicate, directly or indirectly, with one another (e.g., via one or more buses).

The preamble transmission component 610 may transmit, from a first UE to a second UE, a sidelink discovery message preamble corresponding to a sidelink discovery message. The resource component 615 may identify resources for transmission of the sidelink discovery message based on the sidelink discovery message preamble. In some examples, the resource component 615 may identify resources for transmission of the sidelink discovery message based on the SCI message. In some examples, the resource component 615 may identify, at a first UE, a set of resources from a configured set of resources for transmitting a sidelink discovery message to a second UE.

In some examples, the resource component 615 may identify the resources for transmission of the sidelink discovery message based on a configuration. In some examples, the resource component 615 may receive an indication from a base station that indicates the resources for transmission of the sidelink discovery message.

In some examples, the resource component 615 may determine, by the first UE, the resources for transmission of the sidelink discovery message based on a mapping between the sidelink discovery message preamble and the resources for transmission of the sidelink discovery message. In some cases, the mapping includes a hashing rule.

The discovery message component 620 may transmit the sidelink discovery message to the second UE or receiving the sidelink discovery message from the second UE using the identified resources for transmission of the sidelink discovery message. In some examples, the discovery message component 620 may transmit the sidelink discovery message to the second UE or receiving the sidelink discovery message from the second UE using the identified resources for transmission of the sidelink discovery message. In some examples, the discovery message component 620 may transmit the sidelink discovery message to the second UE using the identified set of resources.

In some examples, the discovery message component 620 may transmit the sidelink discovery message to the second UE based on an amount of pending data at the first UE. In some examples, the discovery message component 620 may receive the sidelink discovery message from the second UE based on an absence of pending data at the first UE.

In some cases, the sidelink discovery message indicates a source of timing synchronization between the first UE and the second UE, whether the first UE or the second UE is within a cell coverage, a sidelink synchronization signal identifier corresponding to the first UE, a transmit power control indication, a buffer status report indication, a power headroom report indication, or a combination thereof.

In some cases, the sidelink discovery message preamble indicates to the second UE whether the resources for transmission of the sidelink discovery message are used for transmitting the sidelink discovery message by the first UE or receiving the sidelink discovery message at the first UE.

In some cases, the received sidelink discovery message indicates that the second UE detected the sidelink discovery message preamble, decoded a SCI message, or both. In some cases, the sidelink discovery message preamble is transmitted using unicast, multicast, broadcast, or a combination thereof.

The SCI component 625 may transmit, from a first UE to a second UE, a SCI message corresponding to a sidelink discovery message. In some examples, the SCI component 625 may transmit, from the first UE to the second UE, a SCI message based on the sidelink discovery message preamble, where the SCI message indicates the resources for transmission of the sidelink discovery message. In some examples, the SCI component 625 may receive, at the first UE and from the second UE, a SCI message based on the sidelink discovery message preamble, where the SCI message indicates the resources for transmission of the sidelink discovery message.

In some examples, the SCI component 625 may receive a SCI message from the second UE. In some cases, the received SCI message indicates that the second UE detected the sidelink discovery message preamble. In some cases, the received SCI message indicates an association with the sidelink discovery message preamble. In some cases, the received SCI message is scrambled by an identifier indicated in the sidelink discovery message preamble. In some cases, the received SCI message schedules resources for the first UE to transmit the sidelink discovery message to the second UE. In some cases, the received SCI message schedules resources for the second UE to transmit the sidelink discovery message to the first UE. In some cases, the SCI message indicates to the second UE whether the resources for transmission of the sidelink discovery message are used for transmitting the sidelink discovery message by the first UE or receiving the sidelink discovery message at the first UE.

The timing component 630 may identify a fixed timing relationship between the sidelink discovery message preamble and a SCI message, where the SCI message indicates the resources for transmission of the sidelink discovery message.

The acknowledgment component 635 may receive an acknowledgement message from the second UE indicating that the second UE detected the sidelink discovery message preamble, decoded a SCI message, or both. In some cases, the acknowledgement message is received over a sidelink feedback control channel.

The scheduling request component 640 may receive a sidelink scheduling request over a sidelink feedback channel, where the sidelink scheduling request indicates that the second UE has pending data to transmit. In some cases, the sidelink feedback channel is associated with the identified resources for transmission of the sidelink discovery message or is dynamically indicated by a SCI message.

Figure 7:
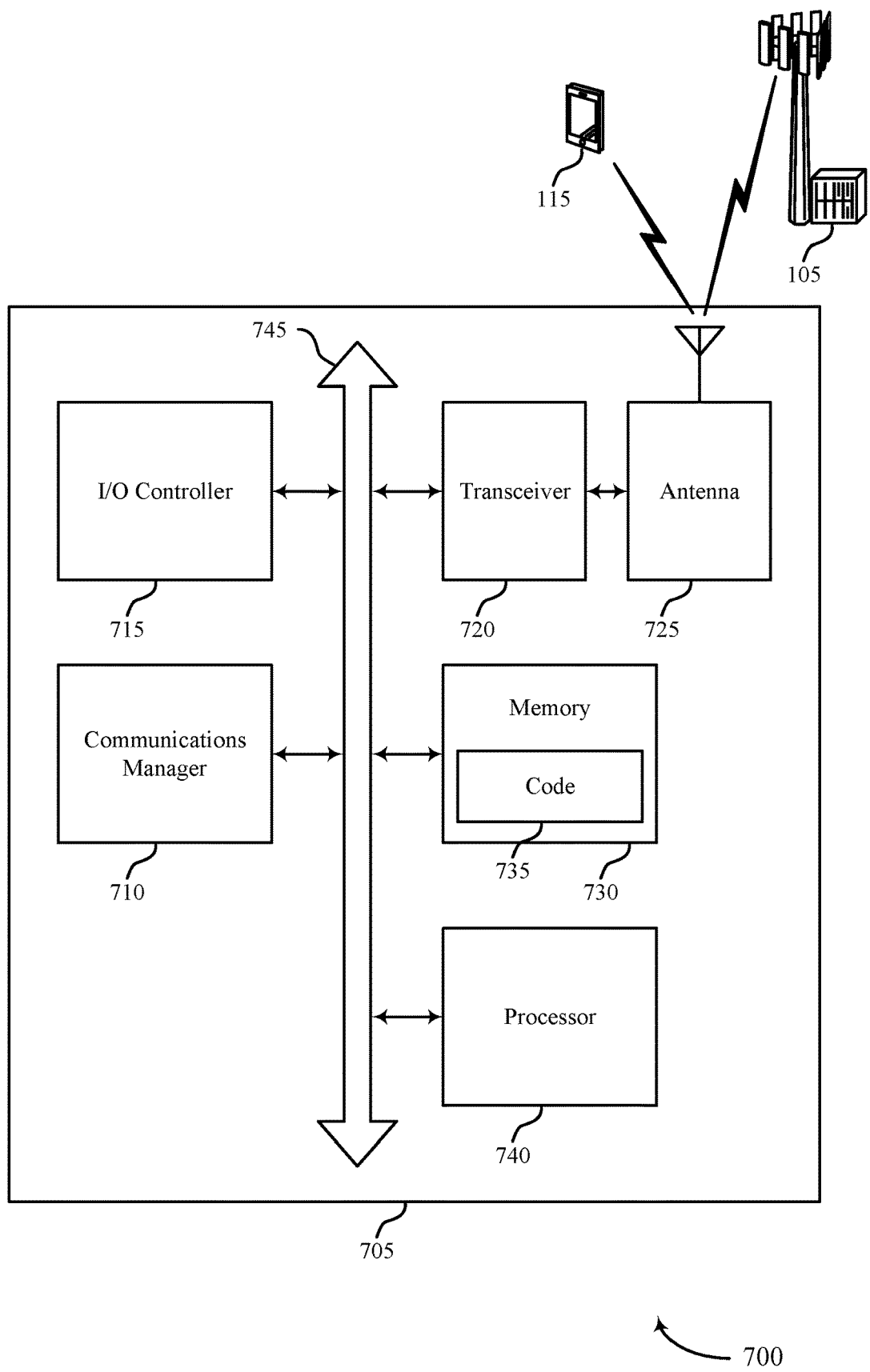
FIG. 7 shows a diagram of a system including a device that supports sidelink discovery procedure in accordance with aspects of the present disclosure.

FIG. 7 shows a diagram of a system 700 including a device 705 that supports sidelink discovery procedure in accordance with aspects of the present disclosure. The device 705 may be an example of or include the components of device 405, device 505, or a UE 115 as described herein. The device 705 may include components for bi-directional voice and data communications including components for transmitting and receiving communications, including a communications manager 710, an I/O controller 715, a transceiver 720, an antenna 725, memory 730, and a processor 740. These components may be in electronic communication via one or more buses (e.g., bus 745).

The communications manager 710 may transmit, from a first UE to a second UE, a sidelink discovery message preamble corresponding to a sidelink discovery message, identify resources for transmission of the sidelink discovery message based on the sidelink discovery message preamble, and transmit the sidelink discovery message to the second UE or receiving the sidelink discovery message from the second UE using the identified resources for transmission of the sidelink discovery message. The communications manager 710 may also transmit, from a first UE to a second UE, a SCI message corresponding to a sidelink discovery message, identify resources for transmission of the sidelink discovery message based on the SCI message, and transmit the sidelink discovery message to the second UE or receiving the sidelink discovery message from the second UE using the identified resources for transmission of the sidelink discovery message. The communications manager 710 may also identify, at a first UE, a set of resources from a configured set of resources for transmitting a sidelink discovery message to a second UE and transmit the sidelink discovery message to the second UE using the identified set of resources.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described herein. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases the device may have more than one antenna 725, which may be capable of concurrently transmitting or receiving multiple wireless transmissions.

The memory 730 may include random-access memory (RAM) and read-only memory (ROM). The memory 730 may store computer-readable, computer-executable code 735 including instructions that, when executed, cause the processor to perform various functions described herein. In some cases, the memory 730 may contain, among other things, a basic I/O system (BIOS) which may control basic hardware or software operation such as the interaction with peripheral components or devices.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting sidelink discovery procedure).

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
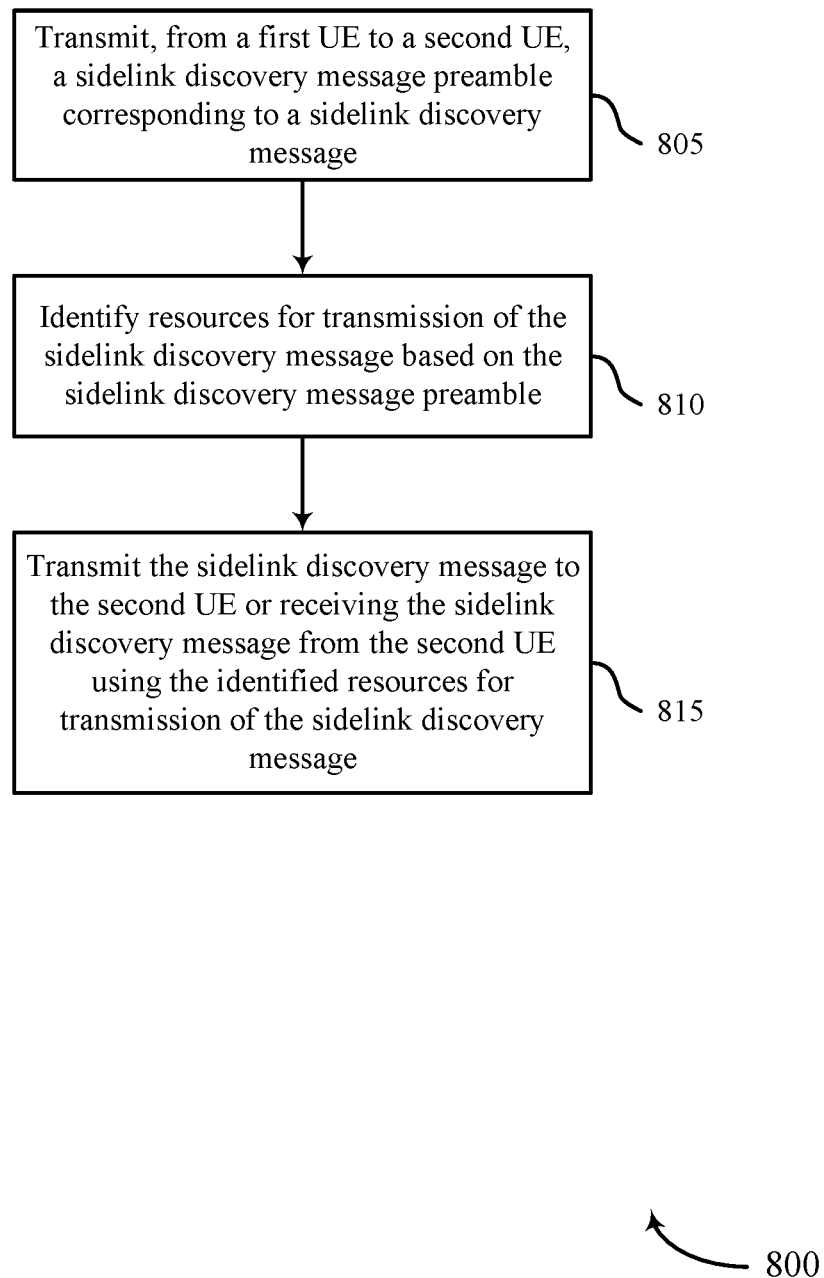
FIGS. 8 through 13 show flowcharts illustrating methods that support sidelink discovery procedure in accordance with aspects of the present disclosure.

FIG. 8 shows a flowchart illustrating a method 800 that supports sidelink discovery procedure in accordance with aspects of the present disclosure. The operations of method 800 may be implemented by a UE 115 or its components as described herein. For example, the operations of method 800 may be performed by a communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 805, the UE may transmit, from a first UE to a second UE, a sidelink discovery message preamble corresponding to a sidelink discovery message. The operations of 805 may be performed according to the methods described herein. In some examples, aspects of the operations of 805 may be performed by a preamble transmission component as described with reference to FIGS. 4 through 7.

At 810, the UE may identify resources for transmission of the sidelink discovery message based on the sidelink discovery message preamble. The operations of 810 may be performed according to the methods described herein. In some examples, aspects of the operations of 810 may be performed by a resource component as described with reference to FIGS. 4 through 7.

At 815, the UE may transmit the sidelink discovery message to the second UE or receiving the sidelink discovery message from the second UE using the identified resources for transmission of the sidelink discovery message. The operations of 815 may be performed according to the methods described herein. In some examples, aspects of the operations of 815 may be performed by a discovery message component as described with reference to FIGS. 4 through 7.

Figure 9:
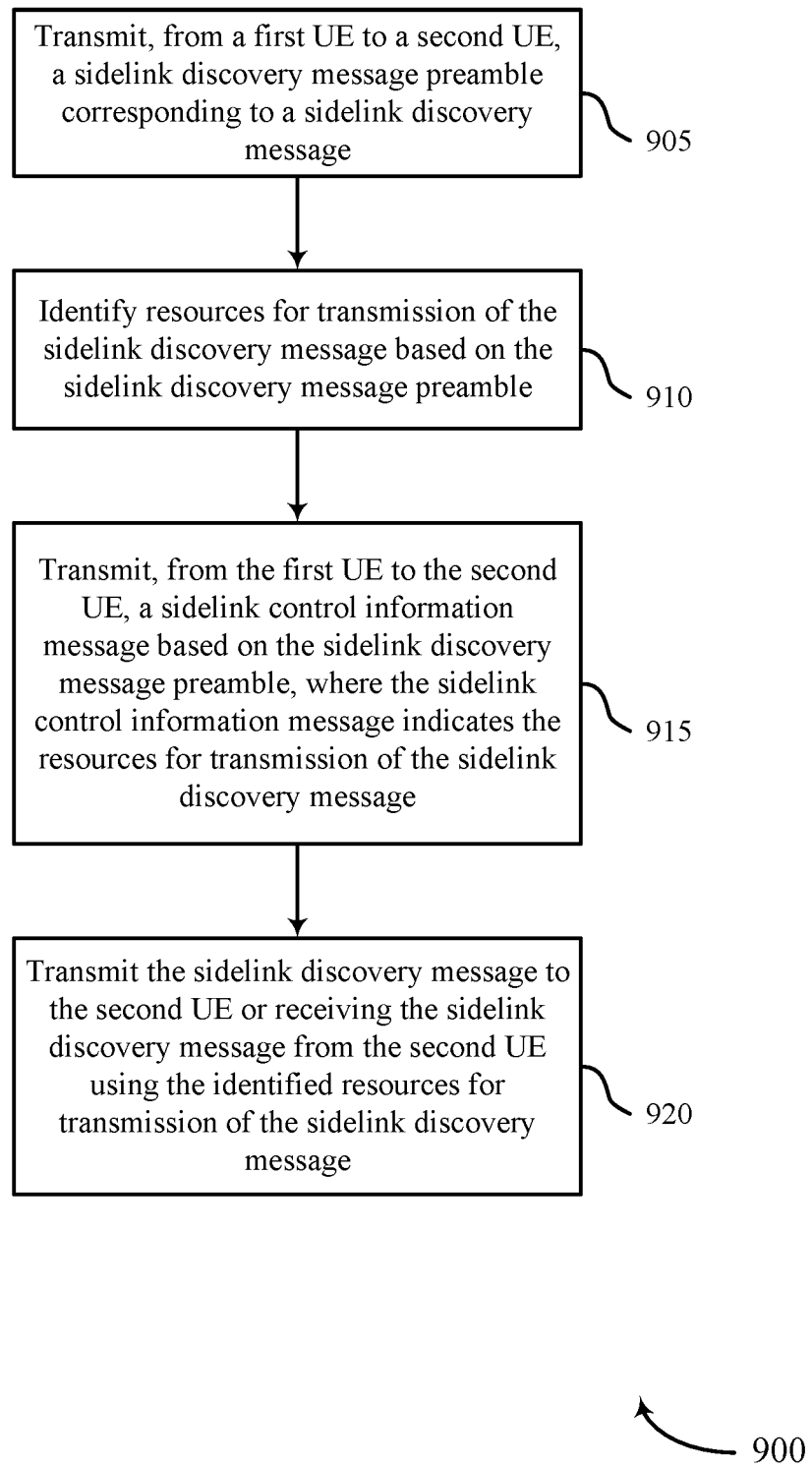

FIG. 9 shows a flowchart illustrating a method 900 that supports sidelink discovery procedure in accordance with aspects of the present disclosure. The operations of method 900 may be implemented by a UE 115 or its components as described herein. For example, the operations of method 900 may be performed by a communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 905, the UE may transmit, from a first UE to a second UE, a sidelink discovery message preamble corresponding to a sidelink discovery message. The operations of 905 may be performed according to the methods described herein. In some examples, aspects of the operations of 905 may be performed by a preamble transmission component as described with reference to FIGS. 4 through 7.

At 910, the UE may identify resources for transmission of the sidelink discovery message based on the sidelink discovery message preamble. The operations of 910 may be performed according to the methods described herein. In some examples, aspects of the operations of 910 may be performed by a resource component as described with reference to FIGS. 4 through 7.

At 915, the UE may transmit, from the first UE to the second UE, a SCI message based on the sidelink discovery message preamble, where the SCI message indicates the resources for transmission of the sidelink discovery message. The operations of 915 may be performed according to the methods described herein. In some examples, aspects of the operations of 915 may be performed by a SCI component as described with reference to FIGS. 4 through 7.

At 920, the UE may transmit the sidelink discovery message to the second UE or receiving the sidelink discovery message from the second UE using the identified resources for transmission of the sidelink discovery message. The operations of 920 may be performed according to the methods described herein. In some examples, aspects of the operations of 920 may be performed by a discovery message component as described with reference to FIGS. 4 through 7.

Figure 10:
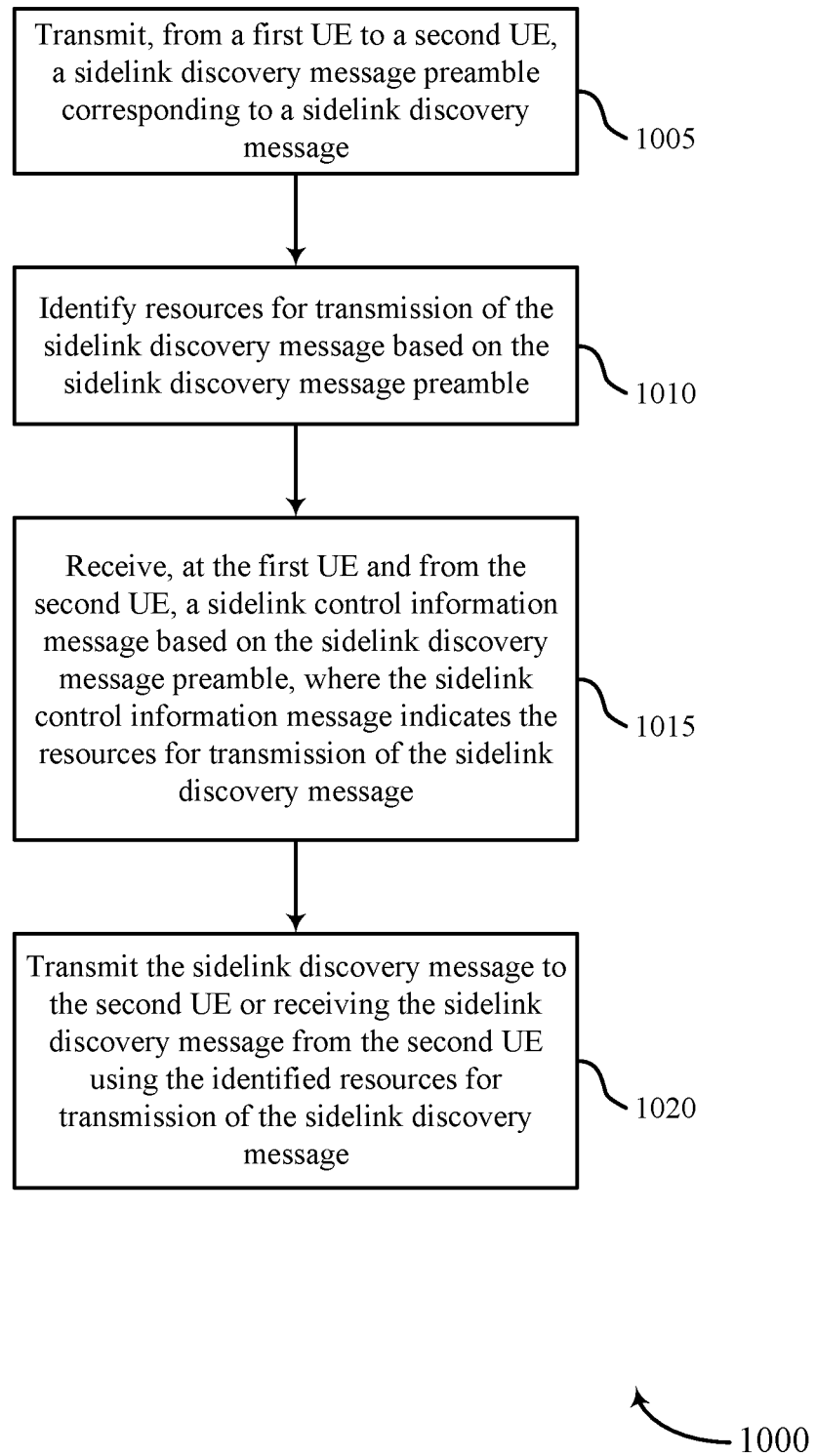

FIG. 10 shows a flowchart illustrating a method 1000 that supports sidelink discovery procedure in accordance with aspects of the present disclosure. The operations of method 1000 may be implemented by a UE 115 or its components as described herein. For example, the operations of method 1000 may be performed by a communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 1005, the UE may transmit, from a first UE to a second UE, a sidelink discovery message preamble corresponding to a sidelink discovery message. The operations of 1005 may be performed according to the methods described herein. In some examples, aspects of the operations of 1005 may be performed by a preamble transmission component as described with reference to FIGS. 4 through 7.

At 1010, the UE may identify resources for transmission of the sidelink discovery message based on the sidelink discovery message preamble. The operations of 1010 may be performed according to the methods described herein. In some examples, aspects of the operations of 1010 may be performed by a resource component as described with reference to FIGS. 4 through 7.

At 1015, the UE may receive, at the first UE and from the second UE, a SCI message based on the sidelink discovery message preamble, where the SCI message indicates the resources for transmission of the sidelink discovery message. The operations of 1015 may be performed according to the methods described herein. In some examples, aspects of the operations of 1015 may be performed by a SCI component as described with reference to FIGS. 4 through 7.

At 1020, the UE may transmit the sidelink discovery message to the second UE or receiving the sidelink discovery message from the second UE using the identified resources for transmission of the sidelink discovery message. The operations of 1020 may be performed according to the methods described herein. In some examples, aspects of the operations of 1020 may be performed by a discovery message component as described with reference to FIGS. 4 through 7.

Figure 11:
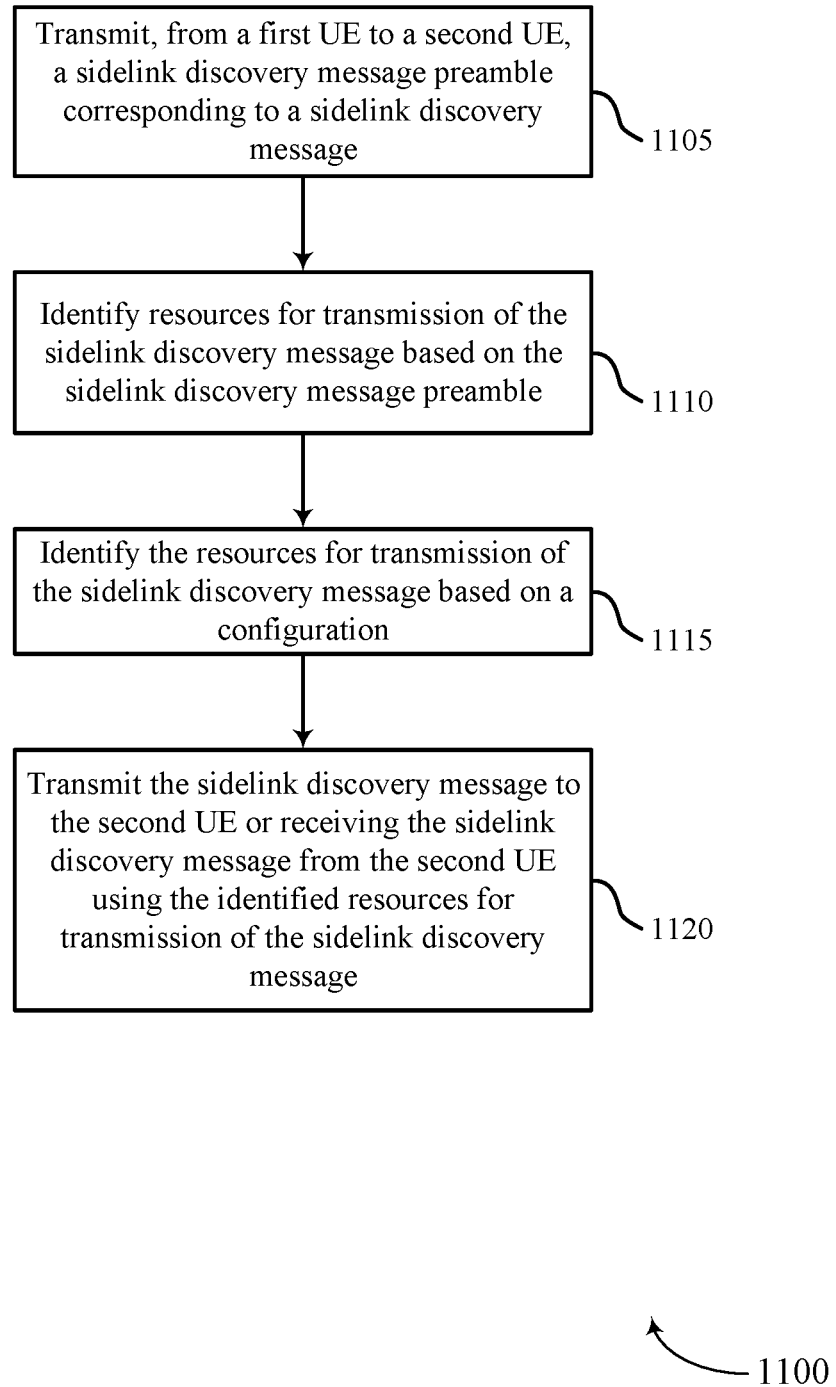

FIG. 11 shows a flowchart illustrating a method 1100 that supports sidelink discovery procedure in accordance with aspects of the present disclosure. The operations of method 1100 may be implemented by a UE 115 or its components as described herein. For example, the operations of method 1100 may be performed by a communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 1105, the UE may transmit, from a first UE to a second UE, a sidelink discovery message preamble corresponding to a sidelink discovery message. The operations of 1105 may be performed according to the methods described herein. In some examples, aspects of the operations of 1105 may be performed by a preamble transmission component as described with reference to FIGS. 4 through 7.

At 1110, the UE may identify resources for transmission of the sidelink discovery message based on the sidelink discovery message preamble. The operations of 1110 may be performed according to the methods described herein. In some examples, aspects of the operations of 1110 may be performed by a resource component as described with reference to FIGS. 4 through 7.

At 1115, the UE may identify the resources for transmission of the sidelink discovery message based on a configuration. The operations of 1115 may be performed according to the methods described herein. In some examples, aspects of the operations of 1115 may be performed by a resource component as described with reference to FIGS. 4 through 7.

At 1120, the UE may transmit the sidelink discovery message to the second UE or receiving the sidelink discovery message from the second UE using the identified resources for transmission of the sidelink discovery message. The operations of 1120 may be performed according to the methods described herein. In some examples, aspects of the operations of 1120 may be performed by a discovery message component as described with reference to FIGS. 4 through 7.

Figure 12:
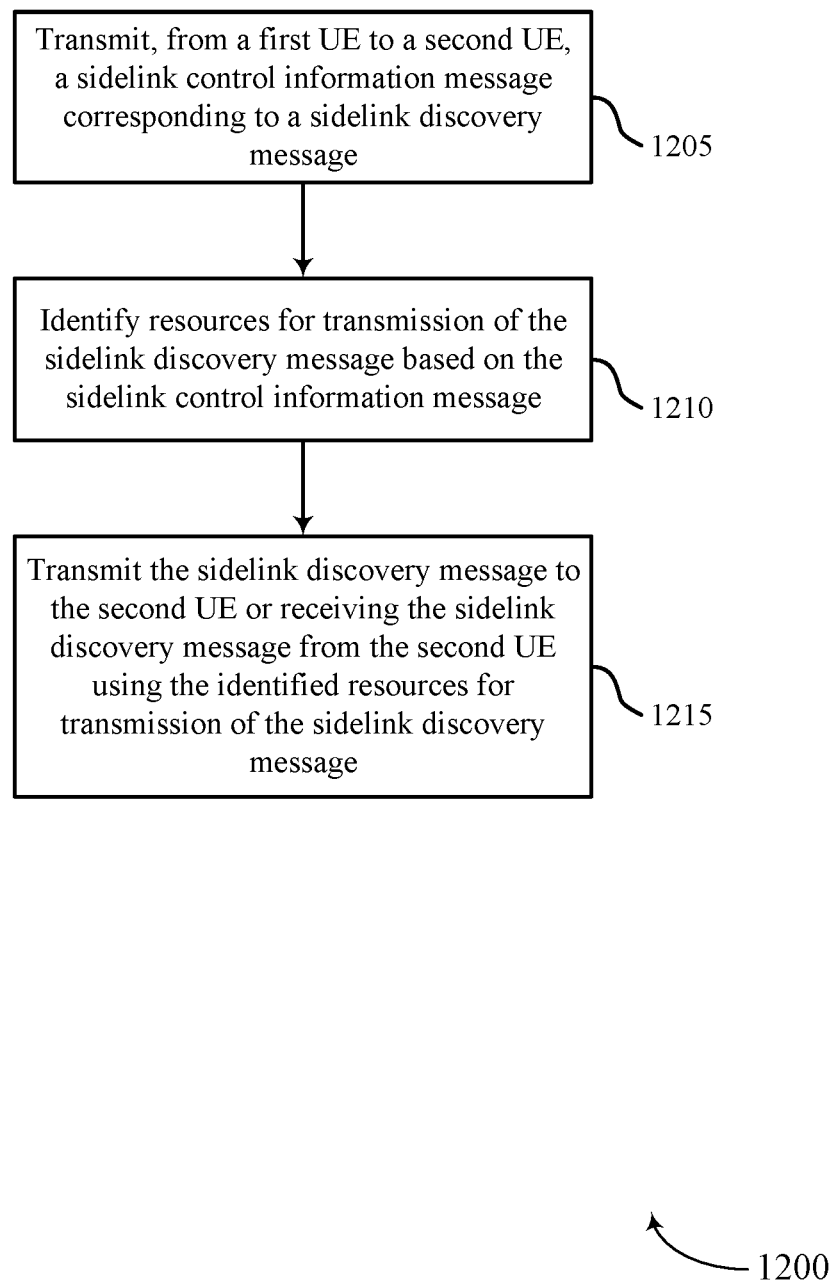

FIG. 12 shows a flowchart illustrating a method 1200 that supports sidelink discovery procedure in accordance with aspects of the present disclosure. The operations of method 1200 may be implemented by a UE 115 or its components as described herein. For example, the operations of method 1200 may be performed by a communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 1205, the UE may transmit, from a first UE to a second UE, a SCI message corresponding to a sidelink discovery message. The operations of 1205 may be performed according to the methods described herein. In some examples, aspects of the operations of 1205 may be performed by a SCI component as described with reference to FIGS. 4 through 7.

At 1210, the UE may identify resources for transmission of the sidelink discovery message based on the SCI message. The operations of 1210 may be performed according to the methods described herein. In some examples, aspects of the operations of 1210 may be performed by a resource component as described with reference to FIGS. 4 through 7.

At 1215, the UE may transmit the sidelink discovery message to the second UE or receiving the sidelink discovery message from the second UE using the identified resources for transmission of the sidelink discovery message. The operations of 1215 may be performed according to the methods described herein. In some examples, aspects of the operations of 1215 may be performed by a discovery message component as described with reference to FIGS. 4 through 7.

Figure 13:
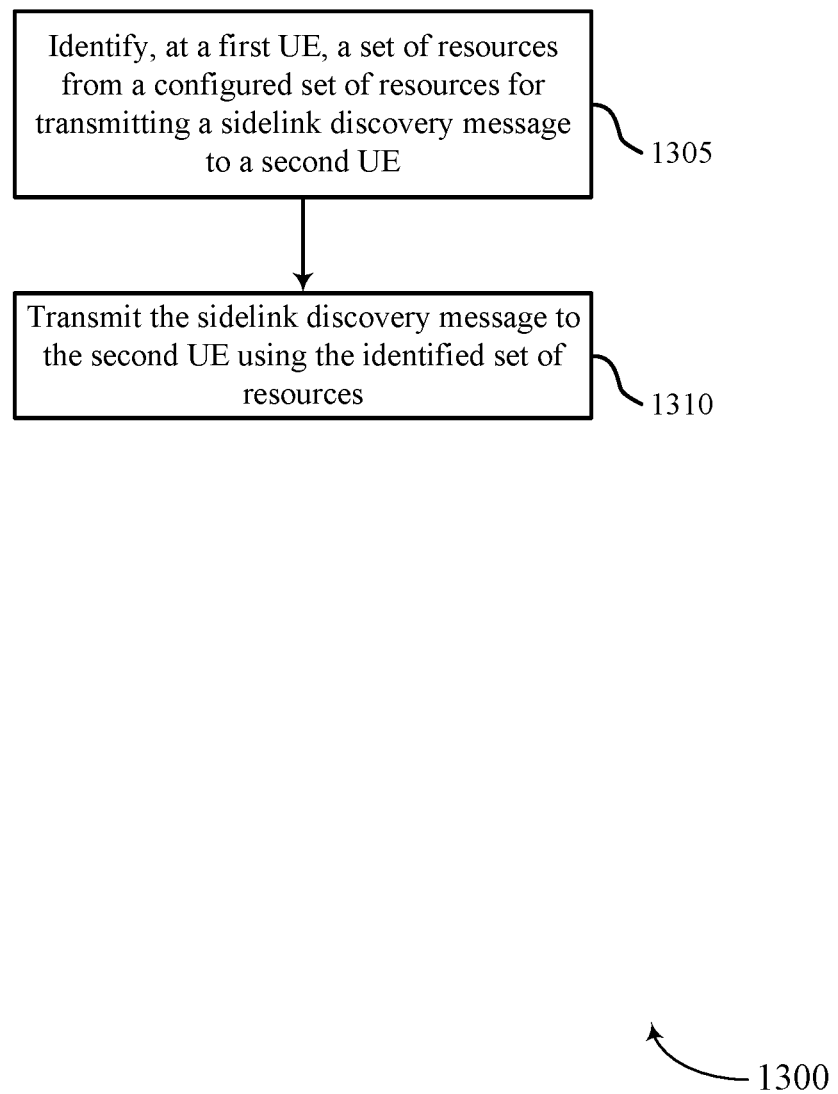

FIG. 13 shows a flowchart illustrating a method 1300 that supports sidelink discovery procedure in accordance with aspects of the present disclosure. The operations of method 1300 may be implemented by a UE 115 or its components as described herein. For example, the operations of method 1300 may be performed by a communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 1305, the UE may identify, at a first UE, a set of resources from a configured set of resources for transmitting a sidelink discovery message to a second UE. The operations of 1305 may be performed according to the methods described herein. In some examples, aspects of the operations of 1305 may be performed by a resource component as described with reference to FIGS. 4 through 7.

At 1310, the UE may transmit the sidelink discovery message to the second UE using the identified set of resources. The operations of 1310 may be performed according to the methods described herein. In some examples, aspects of the operations of 1310 may be performed by a discovery message component as described with reference to FIGS. 4 through 7.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communications, comprising:
    at least one processor; and
    at least one memory coupled with the at least one processor, the at least one memory storing instructions executable by the at least one processor to cause the apparatus to:
        communicate, at a first user equipment (UE) and with a second UE, a sidelink control information message;
        identify, at the first UE and based at least in part on the sidelink control information message, a set of resources from a configured set of resources for transmitting a sidelink discovery message to the second UE; and
        transmit, after the sidelink control information message, the sidelink discovery message to the second UE using the identified set of resources.

2. The apparatus of claim 1, wherein the instructions to communicate the sidelink control information message are further executable to cause the at least one processor to:
    transmit, from the first UE to the second UE, the sidelink control information message corresponding to the sidelink discovery message.

3. The apparatus of claim 2, wherein the sidelink control information message indicates to the second UE whether the set of resources for transmission of the sidelink discovery message are used for transmitting the sidelink discovery message by the first UE or receiving the sidelink discovery message at the first UE.

4. A method for wireless communications, comprising:
    communicating, at a first user equipment (UE) and with a second UE, a sidelink control information message;
    identifying, at the first UE and based at least in part on the sidelink control information message, a set of resources from a configured set of resources for transmitting a sidelink discovery message to the second UE; and
    transmitting, after the sidelink control information message, the sidelink discovery message to the second UE using the identified set of resources.

5. The method of claim 4, wherein communicating the sidelink control information message comprises:
    transmitting, from the first UE to the second UE, the sidelink control information message corresponding to the sidelink discovery message.

6. The method of claim 5, wherein the sidelink control information message indicates to the second UE whether the set of resources for transmission of the sidelink discovery message are used for transmitting the sidelink discovery message by the first UE or receiving the sidelink discovery message at the first UE.

7. The apparatus of claim 1, wherein the instructions to communicate the sidelink control information message are further executable to cause the at least one processor to:
    receive, from the second UE, the sidelink control information message corresponding to the sidelink discovery message.

8. The method of claim 4, wherein communicating the sidelink control information message comprises:
    receiving, from the second UE, the sidelink control information message corresponding to the sidelink discovery message.

* * * * *